C. F. HALL.
Carriage-Springs.
No. 138,247. Patented April 29, 1873.
Fig 1.
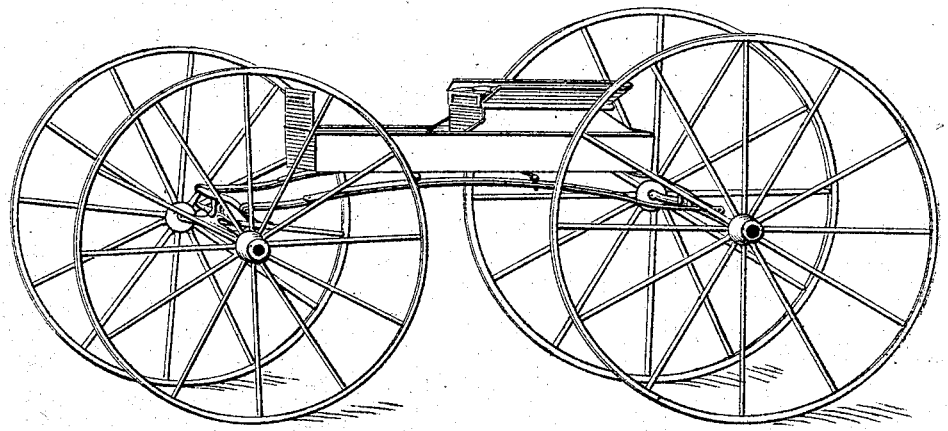
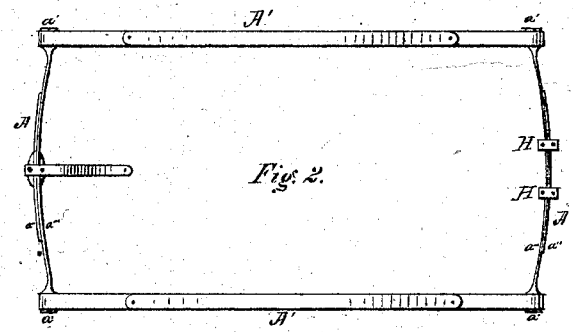
Fig. 4.     Fig. 3.     Fig. 5.
 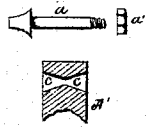 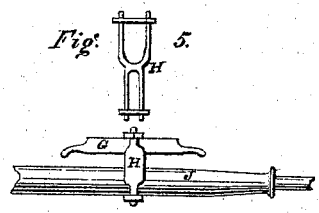
Attest:
E. Mason Goozler
C. F. Hall
Inventor:
Chester Frederick Hall
By N. Crawford, atty.
AM. PHOTO-LITHOGRAPHIC CO. N.Y. (OSBORNE'S PROCESS.)

UNITED STATES PATENT OFFICE.

CHESTER F. HALL, OF ROCKFORD, ILLINOIS.

IMPROVEMENT IN CARRIAGE-SPRINGS.

Specification forming part of Letters Patent No. 138,247, dated April 29, 1873; application filed December 30, 1872.

To all whom it may concern:

Be it known that I, CHESTER FREDERICK HALL, of Rockford, in the county of Winnebago, in the State of Illinois, have made certain Improvements in the Mode of Constructing and Applying the Springs to the Bodies of Wagons, Buggies, or Carriages, of which the following is a specification:

My invention consists in the method of constructing and attaching the springs to the bodies of wagons or carriages, as will be more fully hereinafter described.

In the drawing, Figure 1 is a perspective of a wagon with my springs attached. Fig. 2 is a plan view of the springs. Figs. 3, 4, and 5 details.

A represents the half-elliptic transverse end springs, composed of leaves $a''$ and $a'''$, standing on their edges over the front and hind axles of a wagon, to which the body of the wagon is attached, and upon which the weight of the body rests. $a\ a$ are screw-bolts, fast upon each end of the end spring A, and which go through the double-conical holes $c\ c$ in the ends of the longitudinal springs A, and when so placed the screw-nuts $a'$ secures the transverse springs A to the longitudinal springs A'. The conical holes may be packed with rubber or other yielding substance to prevent rigidity in the joint-connection. Springs A are composed of two or more leaves, $a'''$ and $a''''$, and in the under side of leaves $a''''$ are bearings $b\ b$ to receive the bent lips $b'$ on the leaves $a''$, which secure the two or more leaves together and equalize their elasticity. H H are double-forked clips, one or the lower fork of which embraces the head-block G, or it may embrace the axle J, which holds the transverse springs on their edges and securely in position, and by being attached to the side or longitudinal half-elliptic springs A, by the screw pin or bolt $a$ and nut $a'$, will give great elasticity, and yet have all the requisite strength necessary to sustain the wagon-body and its load without fear of breaking, as by this arrangement the longitudinal springs have free play to expand in length as the weight is placed upon their centers.

I am aware that lips upon one leaf of an elliptic spring have been used to embrace another leaf; but such lips when bent to embrace the inner spring projected the full thickness of the lip, and the inner spring had no recessed bearings or openings to receive the lips, as is necessary in the springs of my invention.

Having thus described my invention, what I claim, and desire to secure by Letters Patent, is—

1. The spring A, in which the leaf $a'''$ has bearings $b\ b$, in combination with leaf $a''$, which has the bent lips $b'$, in the manner and for the purpose substantially as described.

2. The spring A', having conical bolt-holes $c\ c$, in combination with the spring A, having screw bolt or pin $a'$, in the manner and for the purpose substantially as described.

CHESTER FREDERICK HALL. [L. S.]

Witnesses:
    JNO. T. LAKIN,
    GEO. E. KING.